US011906150B1

(12) United States Patent
Chen

(10) Patent No.: US 11,906,150 B1
(45) Date of Patent: Feb. 20, 2024

(54) WATERPROOF COVER FOR LIGHT STRIP END

(71) Applicant: ELEGA GARDEN SOLUTION (NINGBO) CO.LTD., Ningbo (CN)

(72) Inventor: Danfeng Chen, Ningbo (CN)

(73) Assignee: ELEGA GARDEN SOLUTION (NINGBO) CO.LTD., Ningbo (CN)

( * ) Notice: Subject to any disclaimer, the term of this patent is extended or adjusted under 35 U.S.C. 154(b) by 0 days.

(21) Appl. No.: 18/127,091

(22) Filed: Mar. 28, 2023

(51) Int. Cl.
*F21V 31/00* (2006.01)
*F21S 4/28* (2016.01)

(52) U.S. Cl.
CPC .............. *F21V 31/005* (2013.01); *F21S 4/28* (2016.01)

(58) Field of Classification Search
CPC ................................. F21V 31/005; F21S 4/28
See application file for complete search history.

(56) References Cited

U.S. PATENT DOCUMENTS

2018/0128438 A1* 5/2018 Sreshta ................. F21V 31/005

FOREIGN PATENT DOCUMENTS

| | | | | | |
|---|---|---|---|---|---|
| CN | 104344238 A | * | 2/2015 | ............... | F21K 9/17 |
| CN | 205480408 U | * | 8/2016 | ............ | F21K 9/272 |
| CN | 111271616 A | * | 6/2020 | | |
| KR | 101754101 B1 | * | 7/2014 | | |

OTHER PUBLICATIONS

NPL Search InnovationQ+ IP Aug. 12, 2023 (Year: 2023).*

* cited by examiner

*Primary Examiner* — Anabel Ton
(74) *Attorney, Agent, or Firm* — Georgi Korobanov

(57) ABSTRACT

A waterproof cover for light strip end, comprising an end cover main body, wherein a recess is formed on an inner side the main body end cover, and waterproof gel is placed in the recess, and two groups of flexible plastic straps are connected symmetrically on both sides of the main body end cover, and t straps are connected with buckle mechanisms. Insert an end of the light strip body into the recess, so that the end of the light strip body squeezes the waterproof gel, and then flip the two groups of flip covers towards each other. The flip covers and flexible plastic straps move towards each other. The teeth on the plastic buckle squeeze each other, thereby causing the main body of the plastic buckle to bend and deform until the teeth engage with each other, so that the two groups of flap covers are fixedly connected.

6 Claims, 2 Drawing Sheets

WATERPROOF COVER FOR LIGHT STRIP END

TECHNICAL FIELD

The present application relates to the technical field of a waterproof cover for light strip end, in particular to a waterproof cover for light strip end.

BACKGROUND

Waterproof silicone light strip refers to a lighting fixture with a strip structure built in a number of uniformly distributed light-emitting units along the length direction, which mainly plays the role of lighting decoration. It has been widely used in existing life, such as winding on trees, light poles, hanging on walls and ceilings, etc. to play a glare effect and create a pleasant atmosphere.

Existing outdoor waterproof silicone light strips are generally made in lengths of whole meters, such as 1 meter, 2 meters, and 5 meters. In actual use, it is often not long enough or too long, and users need to cut off a part of the length to splice, but it is very troublesome to waterproof the cut end face. Generally, the end surface is covered with silicone rubber cured at room temperature and the end cap is put on. It is very inconvenient to wait for 24 hours to be completely cured before use.

SUMMARY

The purpose of the present application is to provide a waterproof cover for light strip end, so as to solve the problems raised in the above-mentioned background technology.

In order to achieve the above object, the present application provides the following technical solutions: A waterproof cover for light strip end, comprising an end cover main body, wherein a recess is formed on an inner side the end cover main body, and sealing liquid is placed in the recess, wherein two groups of flexible plastic straps are symmetrically connected to both sides of the main body end cover, and the flexible plastic straps are connected to buckle mechanisms with an anti-loosening function.

Preferably, the buckle mechanism comprises a flip cover, and two groups of plastic buckles are symmetrically fixedly connected to both ends of the flip cover, and two groups of locking teeth are arranged on the plastic buckle, and an anti-loosening buckle is arranged on the flip cover.

Preferably, an end of a light strip body is inserted into the recess.

Preferably, the two groups of flip covers are engaged and fixed by four groups of plastic buckles.

Preferably, the sealing liquid is waterproof gel, and a surface of the waterproof gel is adhered to the light strip end.

Preferably, the waterproof gel is adhered in the recess.

Preferably, the material of the end cover main body is nylon sandwiched with glass fiber, and the end cover main body has good weather resistance.

Compared with prior art, the beneficial effect of the present application is:

1. Insert an end of the light strip body into the recess on the inner side of the end cover main body, so that the end of the light strip body squeezes the waterproof gel in the recess, and then flip the two groups of flip covers towards each other. Two groups of the flip covers together with two groups of the flexible plastic straps move towards each other to clamp the end of the light strip body. The teeth on the upper and lower side of the plastic buckle squeeze each other, thereby causing the main body of the plastic buckle to bend and deform until the teeth engage with each other, so that the two groups of flap covers are fixedly connected. It can be assembled and disassembled quickly by hand without using tools.
2. When the flip cover is turned over, the flip cover will squeeze the end of the light strip body, thereby generating an inclined force to push the end of the light strip body close to the waterproof gel in the recess. Secondly, the inclined anti-loosening buckle plays a limiting role on the end of the light strip body. This not only prevents the seal failure when the user moves the light strip or accidentally pulls the end cap, but also ensures that the end of the light strip body can be tightly attached to the waterproof gel to achieve a waterproof effect.
3. The end cover main body protects the internal waterproof gel from the external environment through the weather resistance of its own material (nylon plus glass fiber), thereby preventing the waterproof gel from aging, weathering and failure.

Reference signs: 1. End cover main body; 2. Recess; 3. Waterproof gel; 4. Flexible plastic strap; 5. Buckle mechanism; 6. Light strip body; 501. Flip cover; 502. Plastic buckle; 503. Locking teeth; 504. Anti-loosening buckle.

DETAILED DESCRIPTION

The technical solution in the embodiment of the present application will be clearly and completely described below in conjunction with the drawings in the embodiment of the present application. Apparently, the described embodiments are only some of the embodiments of the present application, not all of them. Based on the embodiments in the present application, all other embodiments obtained by persons of ordinary skill in the art without making creative efforts belong to the protection scope of the present application.

Figure 1:
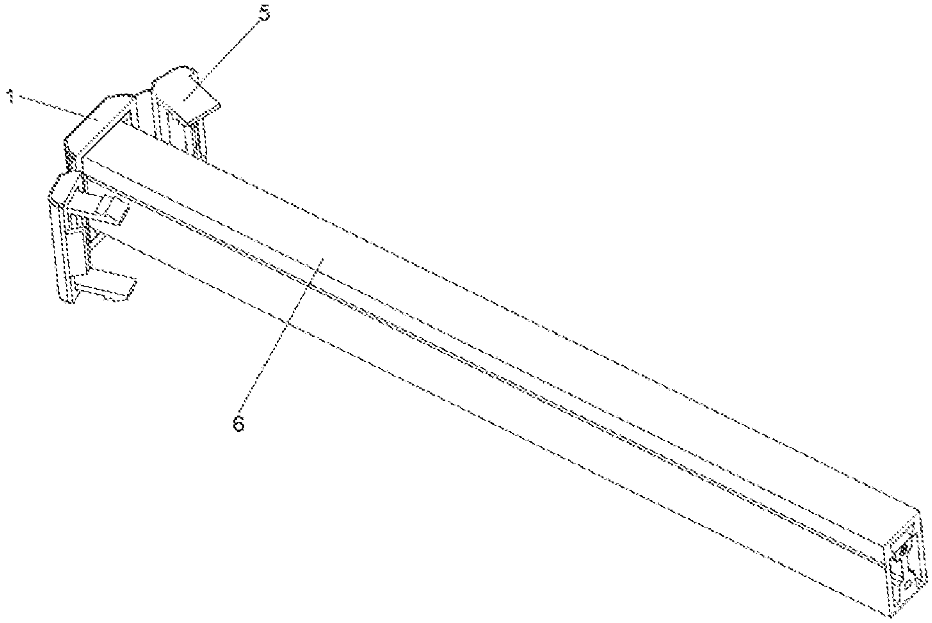
FIG. 1 is a schematic diagram of the present application combined with the flexible plastic strap.
Figure 2:
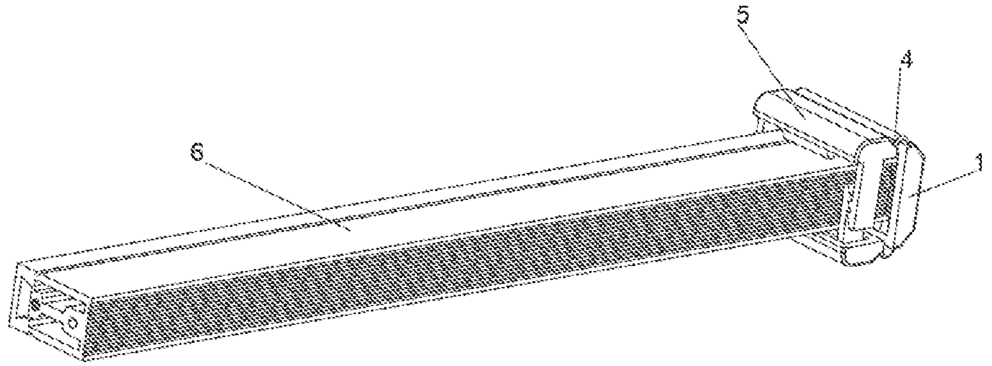
FIG. 2 is a schematic diagram of the application engaged with the flexible plastic strap.
Figure 3:
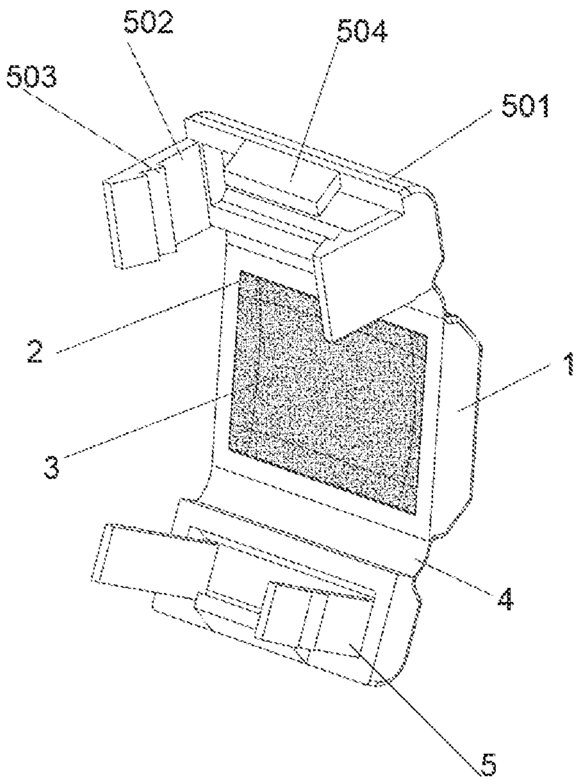
FIG. 3 is a schematic diagram of the present application.

Please refer to FIG. 1 to FIG. 3, the present application provides a technical solution: A waterproof cover for light strip end, comprising an end cover main body 1, wherein a recess 2 is formed on an inner side the end cover main body 1, and sealing liquid is placed in the recess 3, The sealing liquid is waterproof gel 3, which is cured gel, and the surface of waterproof gel 3 adheres to the light strip end.

The waterproof gel 3 itself is soft and has a certain degree of stickiness on the surface, which can reliably adhere to the surface of other objects. Under the structural design of the present application, the waterproof gel can be squeezed and deformed by pressure to fill corners that cannot be reached by conventional materials to achieve full contact.

Two groups of flexible plastic straps 4 are symmetrically connected to both sides of the main body end cover 1, and the flexible plastic straps 4 are connected to buckle mechanisms 5 with an anti-loosening function. The buckle mechanism 5 comprises a flip cover 501, and two groups of plastic buckles 502 are symmetrically fixedly connected to both ends of the flip cover 501, and two groups of locking teeth

503 are arranged on the plastic buckle 502. An end of a light strip body 6 is inserted into the recess 2. The two groups of flip covers 501 are engaged and fixed by four groups of plastic buckles 502. The Waterproof gel 3 sticks in the recess 2. The material of the end cover main body 1 is nylon sandwiched with glass fiber, and the end cover main body 1 has good weather resistance.

The waterproof gel 3 can be transformed into any shape when squeezed, and can be retracted to its original shape after being relaxed. Sticky objects need to be pulled to break free from the gel surface. The end cover main body 1 protects the internal waterproof gel 3 from the external environment through the weather resistance of its own material (nylon plus glass fiber), thereby preventing the waterproof gel 3 from aging, weathering and failure. The main body of the plastic buckle 502 has good elasticity and toughness. When it is necessary to engage the device on the end of the light strip body 6, insert the end of the light strip body 6 into the recess 2 on the inner side of the end cover main body 1, so that the end of the light strip body 6 squeezes the waterproof gel 3 in the recess 2, and then flip the two groups of flip covers 501 towards each other. Two groups of the flip covers 501 together with two groups of the flexible plastic straps 4 move towards each other to clamp the end of the light strip body 6. The teeth 503 on the upper and lower side of the plastic buckle 502 squeeze each other, thereby causing the main body of the plastic buckle 502 to bend and deform until the teeth engage with each other, so that the two groups of flap covers 501 are fixedly connected. It can be assembled and disassembled quickly by hand without using tools.

An anti-loosening buckle 504 is provided on the flip cover 501, wherein the anti-loosening buckle 504 is obliquely positioned on the flip cover 501. When the flip cover 501 is turned over, the flip cover 501 will squeeze the end of the light strip body 6, thereby generating an inclined force to push the end of the light strip body 6 close to the waterproof gel 3 in the recess 2. Secondly, the inclined anti-loosening buckle 504 plays a limiting role on the end of the light strip body 6. This not only prevents the seal failure when the user moves the light strip or accidentally pulls the end cap, but also ensures that the end of the light strip body 6 can be tightly attached to the waterproof gel 3 to achieve a waterproof effect.

During use, insert the end of the light strip body 6 into the recess 2 on the inner side of the end cover main body 1, so that the end of the light strip body 6 squeezes the waterproof gel 3 in the recess 2, and then flip the two groups of flip covers 501 towards each other. Two groups of the flip covers 501 together with two groups of the flexible plastic straps 4 move towards each other to clamp the end of the light strip body 6. The teeth 503 on the upper and lower side of the plastic buckle 502 squeeze each other, so that the main body of the plastic buckle 502 is bent and deformed until the teeth 503 engage with each other. During the flipping process, the flip cover 501 will squeeze the end of the light strip body 6, thereby generating an oblique force to push the end of the light strip body 6 close to the waterproof gel 3 in the recess 2.

Although the embodiments of the present application have been shown and described, those skilled in the art can understand that various changes, modifications and substitutions can be made to these embodiments without departing from the principle and spirit of the present application. The scope of the present application is defined by the appended claims and their equivalents.

What is claimed is:

1. A waterproof cover for light strip end, comprising an end cover main body (1), wherein a recess (2) is formed on an inner side the end cover main body (1), and sealing liquid is placed in the recess (2), wherein two groups of flexible plastic straps (4) are symmetrically connected to both sides of the main body end cover (1), and the flexible plastic straps (4) are connected to buckle mechanisms (5) with an anti-loosening function;

wherein the buckle mechanism (5) comprises a flip cover (501), and two groups of plastic buckles (502) are symmetrically fixedly connected to both ends of the flip cover (501), and two groups of locking teeth (503) are arranged on the plastic buckle (502), and an anti-loosening buckle (504) is arranged on the flip cover (501).

2. The waterproof cover for light strip end according to claim 1, wherein an end of a light strip body (6) is inserted into the recess (2).

3. The waterproof cover for light strip end according to claim 1, wherein the two groups of flip covers (501) are engaged and fixed by four groups of plastic buckles (502).

4. The waterproof cover for light strip end according to claim 1, wherein the sealing liquid is waterproof gel (3), and a surface of the waterproof gel (3) is adhered to the light strip end.

5. The waterproof cover for light strip end according to claim 1, wherein the material of the end cover main body (1) is nylon sandwiched with glass fiber, and the end cover main body (1) has good weather resistance.

6. The waterproof cover for light strip end according to claim 4, wherein the waterproof gel (3) is adhered in the recess (2).

* * * * *